United States Patent Office 3,031,904
Patented May 1, 1962

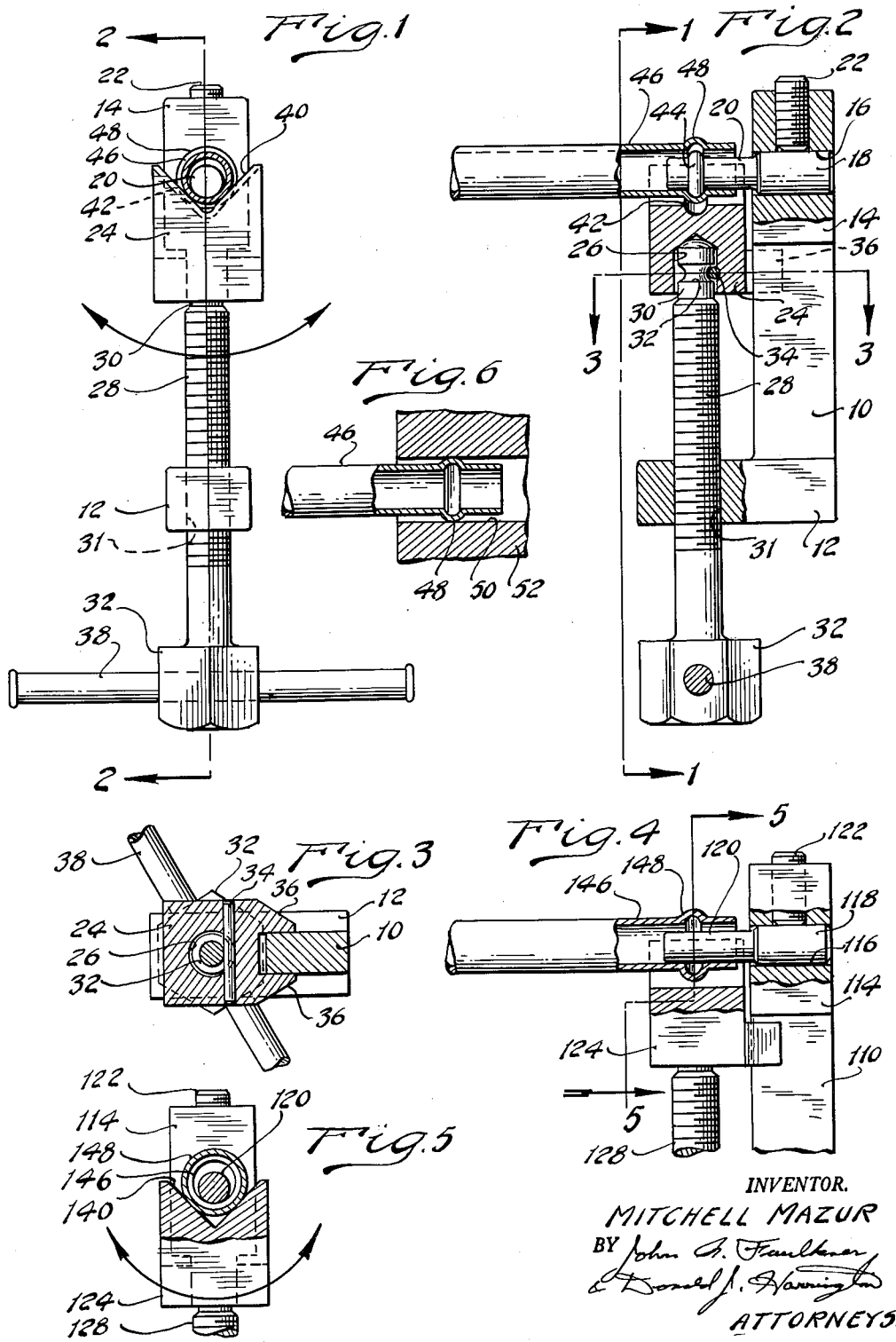

3,031,904
TOOL FOR SHAPING TUBULAR MATERIAL
Mitchell Mazur, Detroit, Mich., assignor to Ford Motor Company, Dearborn, Mich., a corporation of Delaware
Filed May 31, 1960, Ser. No. 32,903
7 Claims. (Cl. 81—15)

My invention relates generally to metal working tools, and more particularly to a hand tool capable of being used to form annular projections on tubing.

In hydraulic apparatus it is common practice to use hydraulic tubing made of deformable material such as copper or aluminum for transferring fluid pressure from one component to another. The components may be located in a control body and the tubing may be secured to the body by means of a force fit between an end of the tubing and a mating hole in the body.

Such an arrangement finds particular utility in automatic power transmission mechanisms that employ tubing for transferring pressure from a fluid pressure pump to a control valve body and from the valve body to transmission clutch and brake servos. The ends of the tubing may in this instance be forced into cooperating ports in the control valve body. The tool of my instant invention is capable of forming an annular shoulder or projection about the tubing adjacent the end, and the shoulder may then be wedged into a cooperating port in the valve body to provide a force fit. The size of the shoulder can be varied between certain limits as desired.

An alternate form of my invention is adapted to reduce the size of the shoulder in the event that the shoulder is too large in diameter to permit a force fit within a port of a particular size.

The provision of a tool of the type above set forth being a principal object of my invention, it is a further object of my invention to provide a hand tool having a head which may be adjustably positioned toward a relatively stationary spindle, said spindle and head defining cooperating dies between which the deformable metal tubing may be positioned.

It is a further object to provide a tool of the type above described wherein the head may be advanced and retracted manually, and wherein the spindle is adapted to be received within one end of the tubing.

It is a further object of my invention to provide a tool of the type above described wherein the spindle is formed with an external annular projection, and wherein the head is formed with a groove which cooperates with the annular projection.

It is a further object of my invention to provide a tool of the type above described wherein the spindle is formed with a continuous cylindrical surface, and wherein the head is formed with a pair of continuous plane surfaces that define a groove, the vertex of the groove being in alignment with the axis of the spindle.

For the purpose of more particularly describing the principal features of my invention, reference will be made to the accompanying drawings wherein:

FIGURE 1 is a side view of one form of the tool of my instant invention as viewed along section line 1—1 of FIGURE 2;

FIGURE 2 is a longitudinal cross-sectional view, partly in elevation, of the tool shown in FIGURE 1, and is taken along section line 2—2 of FIGURE 1;

FIGURE 3 is a transverse cross-sectional view of a portion of the tool in FIGURES 1 and 2, and is taken along section line 3—3 of FIGURE 2;

FIGURE 4 is a partial cross-sectional view of a second embodiment of my invention; and, FIGURE 5 is a cross-sectional view taken along section line 5—5 of FIGURE 4.

FIGURE 6 is a subassembly view, partly in cross section, showing a tube inserted within a cooperating fluid pressure port.

Referring first to FIGURES 1 and 2, numeral 10 designates a main body portion for the tool. An extension 12 is formed at one end of body portion 10 and an enlarged portion 14 is formed at the other end thereof. The portion 14 is apertured as shown at 16 and a spindle 18 is received within the aperture 16. The spindle 18 includes an extended portion 20. The spindle 18 may be held in place by means of set screw 22 slidably received within the end of the portion 14.

The tool of my instant invention further includes a head 24 which may be formed with a rectangular cross-section. The head 24 is recessed as shown at 26 for the purpose of receiving therein a threaded adjusting member 28, said adjusting member including a terminal part 30 of reduced diameter and having a groove 32. A retainer pin 34 is received within the head 24 and it cooperates with groove 32 for the purpose of retaining the member 28 in place while permitting relative rotation to take place between the member 28 and the head 24.

Head 24 includes a pair of extensions 36 which straddle either side of the main body portion 10 and which function to guide the head 24 during movement of the latter along the body portion 10.

The adjusting member 28 is threadably received through a cooperating threaded opening 31 in extension 12, and it is formed with a hexagonal part 32 to accommodate a suitable hand tool such as a wrench.

The member 28 can be apertured to receive a bar 38 to facilitate manual turning of the adjusting member 28 and to thereby effect a vertical adjustment of the head 24 along the body portion 10.

The head 14 is formed with a grooved end as indicated at 40, said groove being defined by angularly disposed plane surfaces. A groove 42 of circular cross-section is formed in the plane surfaces of the recess 40 so that they run transversely with respect to the direction of the axis of spindle 18.

Spindle 18 is formed with an external shoulder of annular shape, said shoulder being designated by reference character 44. Shoulder 44 is similar in shape to groove 42.

A tube 46 can be inserted over spindle 18, and when the adjusting member 28 is rotated, the head 24 will press the tube 46 against the spindle extended portion 20. The internal diameter of the tubing 46 is substantially greater than the diameter of the shoulder 44.

If the tool is then rotated about the axis of spindle 18 while the head 24 is maintained in clamping engagement with the extended portion 20, the tube will become deformed as shown at 48 so that it generally conforms in shape to shoulder 44. As more clamping pressure is applied, the shoulder 48 will become progressively larger. The dimensions of the shoulder 48 will be uniform by reason of the fact that the tool can be rotated with relative ease. If desired, the tubing 46 can be held in place in a suitable vise, although under normal conditions the vise will not be required since the tool can be operated so that the turning torque applied to the tubing is relatively slight.

After the shoulder 48 is formed, the end of the tubing 46 may be inserted within an opening in the control valve body, as best shown in FIGURE 6. The valve body is shown in FIGURE 6 at 52 and the port cooperating with the end of the tubing is designated by reference character 50. It may be seen that the shoulder 58 frictionally engages the internal wall of the port 50, thereby producing a force fit.

Referring next to FIGURES 4 and 5, I have illustrated another embodiment of my invention, and it comprises a body 110 and portion 114. A spindle 118 is received within a cooperating opening 116 in portion 114, and it is formed with an extended portion 120. The spindle 118 is held in place by a suitable set screw 122.

A movable head is shown at 124 and it is provided with a recess 140 which is defined by angularly disposed plane surfaces. The extended portion 120 may be received within the end of tubing 146, and the head 124 can be adjustably positioned in a manner similar to that above described with reference to FIGURES 1, 2 and 3, a suitable adjusting member being shown at 128. The end of member 128 can be pivotally connected to the head 124 as in the embodiment of FIGURES 1, 2 and 3.

It will be readily apparent that when the adjusting member 128 is moved, the head 124 will be brought into engagement with a shoulder 148 on the tubing 146 so that the tubing 146 is clamped against the extended portion 120 of the spindle 118.

The tool in FIGURES 4 and 5 can be used in conjunction with the tool in FIGURES 1, 2 and 3, and the outer diameter of the shoulders 148 can be reduced as desired by using the tool of FIGURES 4 and 5 if the shoulder is formed inadvertently with a diameter too large to facilitate a press fit within a fluid pressure port of a given size.

It thus is apparent that a shoulder 148 can readily be formed by means of a simple clamping and turning operation, and the diameter may be reduced if this is desired by inserting the spindle 118 within the tubing rather than the spindle 18. The tool then can be rotated as before until the outside diameter of the shoulder 148 is reduced to a uniform degree around its entire periphery. A clamping pressure may be maintained on the head 124 during this turning operation.

Having thus described the principal features of my invention, what I claim and desire to secure by United States Letters Patent is:

1. A hand tool for deforming the end of tubing comprising an elongated body, a threaded portion connected to said body, an adjusting member threadably connected to said threaded portion, said adjusting member being adapted to rotate about an axis which is generally parallel to the principal axis of said body portion, a head portion disposed adjacent and engageable with said adjusting member, means for guiding said head portion for movement along said body when said adjusting member is rotated, and a spindle carried by said body at a location which is in the line of movement of said head portion, said spindle being adapted to be received within the end of said tubing whereby said end may be deformed when said head portion is advanced into clamping engagement with said tubing and when said tool is turned relative to said tubing about the axis of said spindle.

2. A hand tool for deforming the end of tubing comprising an elongated body, a threaded portion connected to said body, an adjusting member threadably received within said threaded portion, said adjusting member being adapted to rotate about an axis which is generally parallel to the principal axis of said body portion, a head portion journaled on said adjusting member, means for guiding said head portion for movement along said body when said adjusting member is rotated, a spindle carried by said body at a location which is in the line of movement of said head portion, said spindle being adapted to be received within the end of said tubing, said spindle being formed with an annular shoulder about its periphery, and a groove formed in said head portion, said groove being aligned with said annular shoulder and adapted to cooperate therewith to form an annular shoulder about said tubing when said head portion is advanced into clamping engagement with said tubing and when said tool is turned about the axis of said spindle.

3. A hand tool for deforming the end of tubing comprising an elongated body, a threaded portion connected to said body, an adjusting member threadably received within said threaded portion, said adjusting member being adapted to rotate about an axis which is generally parallel to the principal axis of said body portion, a head portion journaled on said adjusting member, means for guiding said head portion for movement long said body when said adjusting member is rotated, a spindle carried by said body at a location which is in the line of movement of said head portion, said spindle being adapted to be received within the end of said tubing whereby said end may be deformed when said head portion is advanced into clamping engagement with said tubing and when said tool is turned relative to said tubing about the axis of said spindle, said spindle being formed with an annular shoulder about its periphery, said head being formed with angularly disposed plane surfaces that define a V-shaped recess, and grooves formed in said plane surfaces, said grooves being in alignment with the annular shoulder on said spindle, said spindle being adapted to be advanced within said recess when said adjusting member is rotated about its axis.

4. A hand tool for deforming the end of tubing comprising a body portion, an adjusting member threadably connected to said body portion, a head portion rotatably journaled on said adjusting member, and a spindle secured to said body portion, said spindle being adapted to be received within the end of said tubing, said head portion being adapted to be advanced toward said spindle when said adjusting member is rotated whereby said tubing is clamped between said head and said spindle, said head portion being formed with a V-shaped recess defined by angularly situated plane surfaces, said spindle being received within said recess when said adjusting member is turned about its axis and when said head portion is advanced toward said spindle.

5. A hand tool for deforming the end of tubing comprising a body portion, an adjusting member threadably connected to said body portion, a head portion rotatably journaled on said adjusting member, and a spindle secured to said body portion, said spindle being adapted to be received within the end of said tubing, said head portion being adapted to be advanced toward said spindle when said adjusting member is rotated whereby said tubing is clamped between said head and said spindle, said adjusting member comprising a screw threaded portion and an enlarged portion, said enlarged portion being apertured to receive a cross bar, the latter facilitating a manual adjustment of said adjusting member during a clamping operation.

6. A hand tool for deforming the end of tubing comprising an elongated body, a threaded portion connected to said body, an adjusting member threadably received within said threaded portion, said adjusting member being adapted to rotate about an axis which is generally parallel to the principal axis of said body portion, a head portion journaled on said adjusting member, means for guiding said head portion for movement along said body when said adjusting member is rotated, and a spindle carried by said body at a location which is in the line of movement of said head portion, said spindle being adapted to be received within the end of said tubing whereby said end may be deformed when said head portion is advanced into clamping engagement with said tubing and when said tool is turned relative to said tubing about the axis of said spindle, said adjusting member comprising a screw threaded portion and an enlarged portion, said enlarged portion being apertured to receive a cross bar, the latter facilitating a manual adjustment of said adjusting member during a clamping operation.

7. A hand tool for deforming the end of tubing comprising an elongated body, a threaded portion connected to said body, an adjusting member threadably received within said threaded portion, said adjusting member being adapted to rotate about an axis which is generally parallel to the principal axis of said body portion, a head portion journaled on said adjusting member, means for guiding said head portion for movement along said body when said adjusting member is rotated, a spindle carried by said body at a location which is in the line of movement of said head portion, said spindle being adapted to be received within the end of said tubing whereby said end may be deformed when said head portion is advanced into clamping engagement with said tubing and when said tool is turned relative to said tubing about the axis of said spindle, said adjusting member comprising a screw threaded portion and an enlarged portion, said enlarged portion being apertured to receive a cross bar, the latter facilitating a manual adjustment of said adjusting member during a clamping operation, said adjusting member being formed with an annular groove, said head portion being apertured to receive said adjusting member, and a pin received through said head portion adjacent said adjusting member and positioned in the groove in said adjusting member whereby a swivel connection between said adjusting member and said head portion is established.

References Cited in the file of this patent

UNITED STATES PATENTS

| | | |
|---|---|---|
| 200,689 | Brombacher | Feb. 26, 1878 |
| 1,724,920 | Fischer | Aug. 20, 1929 |
| 1,804,815 | Schultis | May 12, 1931 |
| 2,024,803 | Nelson | Dec. 17, 1935 |
| 2,377,406 | Dearick | June 5, 1945 |
| 2,445,303 | Fisher | July 13, 1948 |
| 2,453,126 | Forcier | Nov. 9, 1948 |
| 2,657,733 | Champion | Nov. 3, 1953 |
| 2,809,687 | Ogle | Oct. 15, 1957 |